March 8, 1966 R. W. CAMPBELL 3,239,701
BRUSHLESS OIL COOLED MOTOR
Filed Sept. 14, 1962 3 Sheets-Sheet 1

INVENTOR.
Robert W. Campbell
BY
C. R. Meland
HIS ATTORNEY

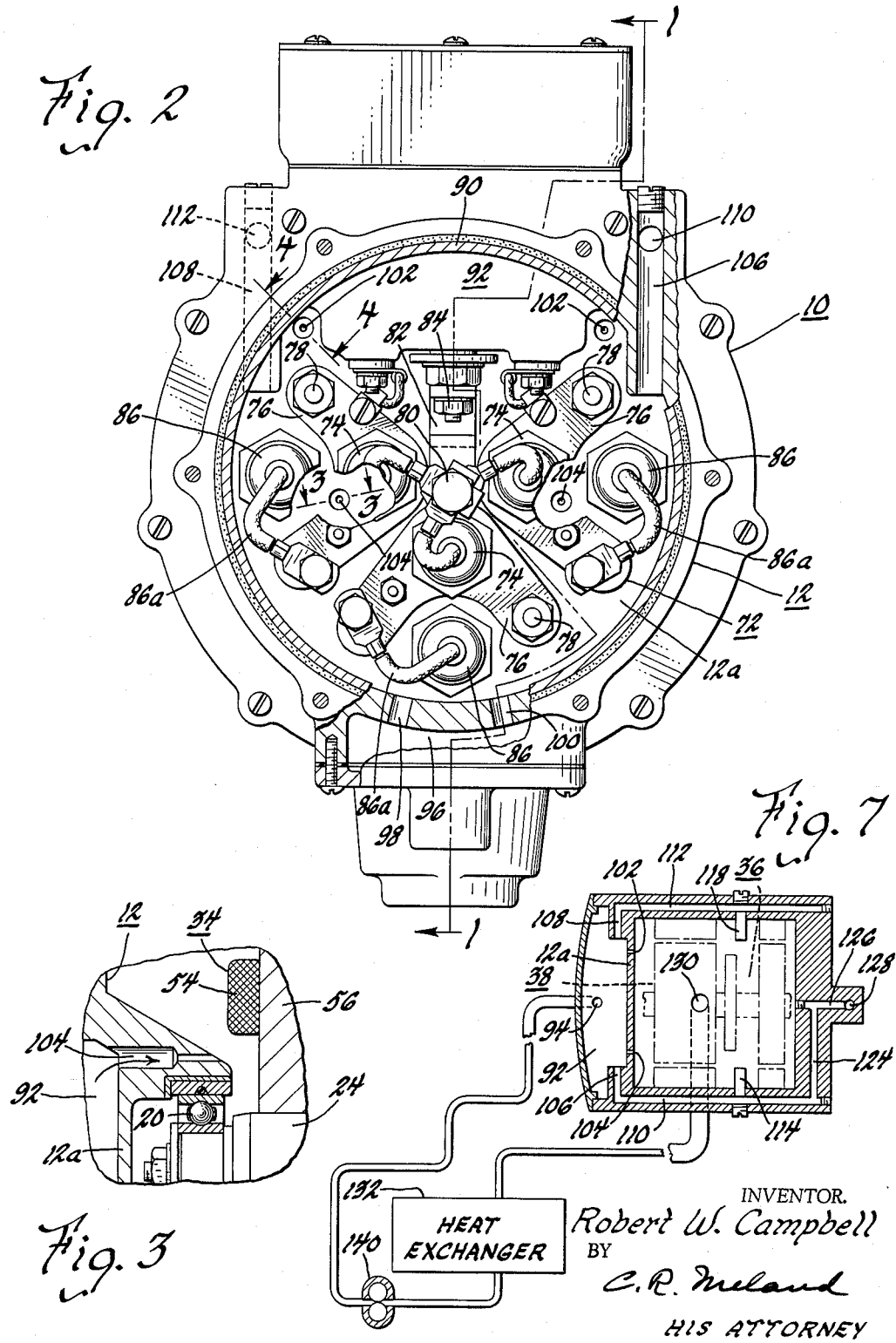

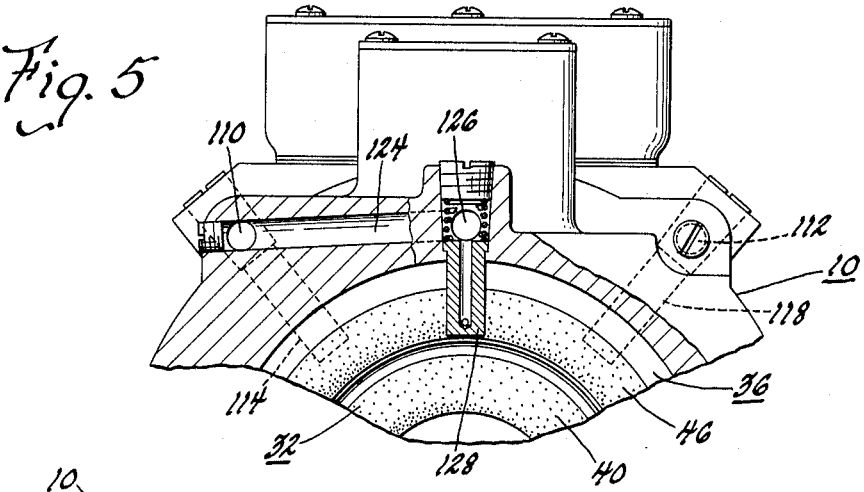
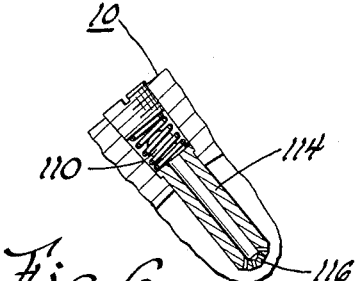
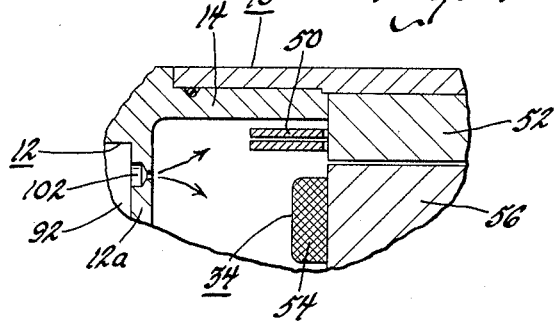
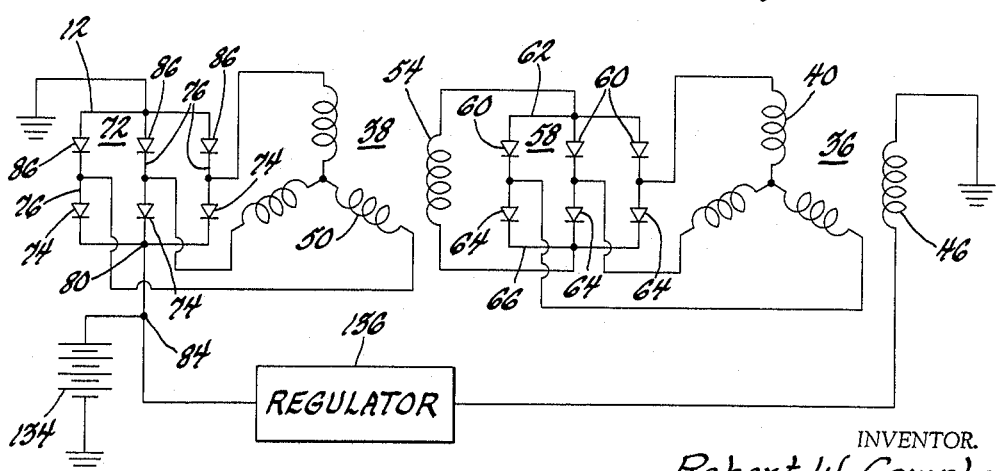

United States Patent Office 3,239,701
Patented Mar. 8, 1966

3,239,701
BRUSHLESS OIL COOLED MOTOR
Robert W. Campbell, Anderson, Ind., assignor to General Motors Corporation, Detroit, Mich., a corporation of Delaware
Filed Sept. 14, 1962, Ser. No. 223,752
4 Claims. (Cl. 310—112)

This invention relates to dynamoelectric machines and more particularly to a brushless alternating current generator that has a direct current output and an integral exciter for supplying field current to the main generator.

One of the objects of this invention is to provide a brushless power unit which is comprised of a main alternating current generator having a rotatable field winding and an exciter generator which supplies direct current to the rotatable field winding of the main generator through diodes that are rotatable with the rotors of the main and exciter generators, and wherein the A.C. output of the main generator is rectified to direct current by built-in diodes. With the arrangement as just described, a very high output D.C. power unit is provided in a single package.

Still another object of this invention is to provide a brushless power unit which has main and exciter generators and diodes which rotate with the rotors of the main and exciter generators for supplying direct current to the rotor field winding of the main generator, and wherein the power unit has means for spraying a cooling medium on the diodes as they rotate.

A further object of this invention is to provide a dynamoelectric machine of the type described wherein diodes rectify the A.C. output of an exciter generator to direct current which then is applied to the rotating field of the main A.C. generator and wherein the output winding of the main A.C. generator is rectified by another group of diodes and further wherein all of these diodes are cooled as well as the windings of the generator by a cooling medium which is circulated through the dynamoelectric machine.

Further objects and advantages of the present invention will be apparent from the following description, reference being had to the accompanying drawings wherein preferred embodiments of the present invention are clearly shown.

In the drawings:

FIGURE 2 is a sectional view taken along line 2—2 of FIGURE 1.

FIGURE 3 is an enlarged fragmentary sectional view taken along line 3—3 of FIGURE 2.

FIGURE 4 is an enlarged fragmentary sectional view taken along line 4—4 of FIGURE 2.

FIGURE 5 is a fragmentary view of a portion of the dynamoelectric machine illustrated in FIGURE 1.

FIGURE 6 is a fragmentary sectional view of one of the spray nozzles illustrated in FIGURE 5.

FIGURE 7 is a schematic diagram illustrating the oil cooling circuit for the dynamoelectric machine of this invention.

FIGURE 8 is a schematic electric circuit diagram of a dynamoelectric machine made in accordance with this invention.

Figure 1:
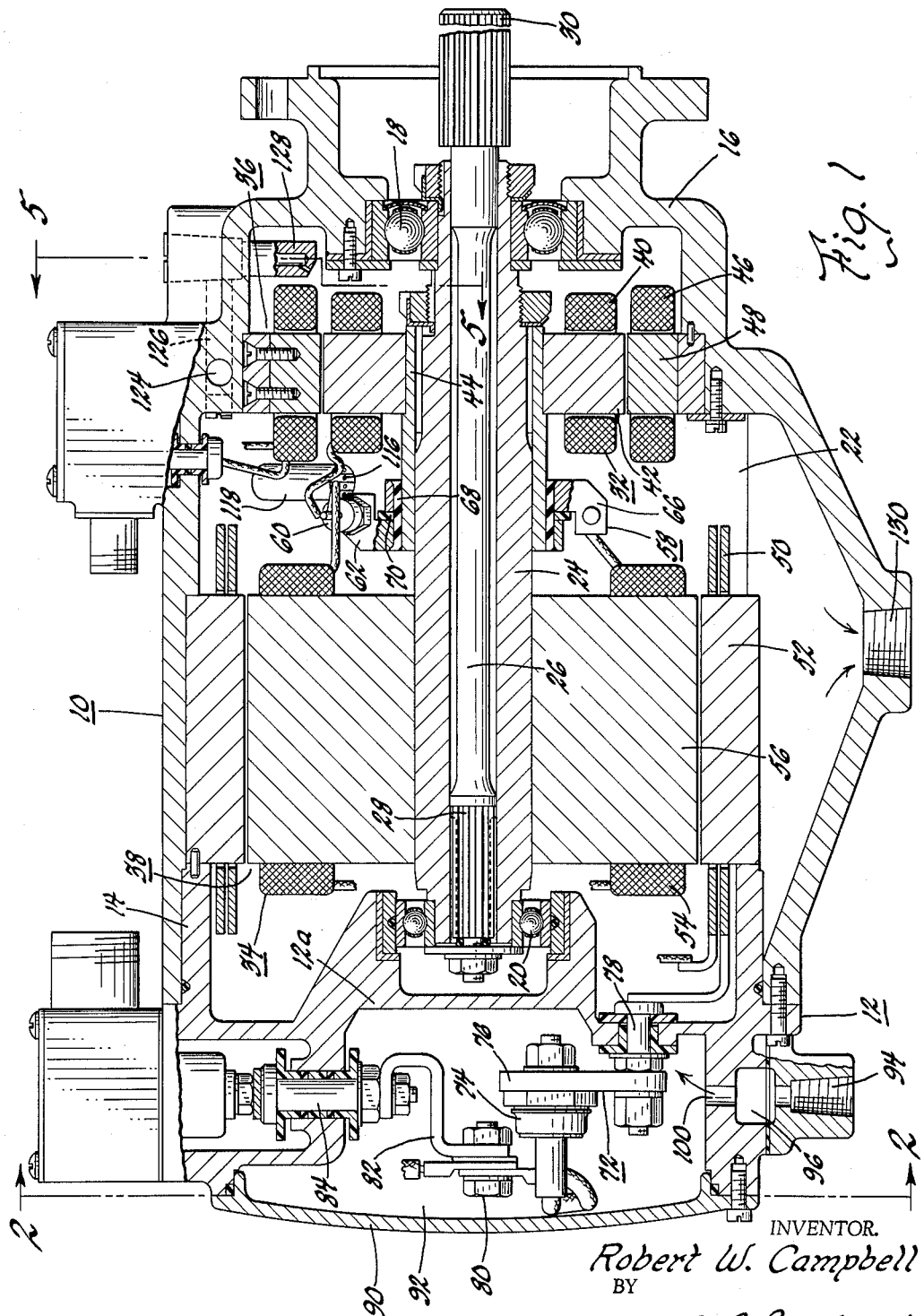
FIGURE 1 is a sectional view of a brushless dynamoelectric machine made in accordance with this invention and taken along line 1—1 of FIGURE 2.

Referring now to the drawings and more particularly to FIGURE 1, the reference numeral 10 generally designates a frame for the dynamoelectric machine. This frame overlaps the annular portion 12 of another end frame which is generally designated by reference numeral 14. The end section 16 of the frame 10 supports a ball bearing assembly 18 whereas the end frame 12 supports another ball bearing assembly 20. The ball bearing assembly 18 has suitable oil seals so that the compartment 22 is liquid tight.

The inner races of the ball bearing assemblies 18 and 20 engage a hollow rotatable shaft 24. The shaft 24 receives a quill shaft 26 which is splined as at 28 to engage internal splines on the shaft 24. It will be appreciated that when the shaft 26 is driven from its end 30, the shaft 24 will rotate therewith.

The shaft 24 carries rotors 32 and 34 which form parts of an exciter generator 36 and a main generator 38. The rotor 32 includes a three phase Y-connected winding 40 which is supported on the magnetic core 42. The magnetic core 42 is secured to a sleeve 44 which in turn is splined to the shaft 24. The stationary part of the exciter generator 36 includes a field winding 46 which is supported by the magnetic part 48. The field winding 46 is energized with direct current and as the rotor 32 rotates, a three-phase alternating current is generated in the winding 40.

The main generator 38 has a three-phase Y-connected stator winding 50 which is supported by the stator iron 52 which in turn is supported by the outer housing 10. The rotor of the main generator 38 is of the salient pole type having a winding 54 wound on the magnetic core 56. The magnetic core 56 is rotatably driven by the shaft 24.

The A.C. output of the rotor winding 40 is rectified to direct current by a three-phase full wave bridge rectifier network which is designated in its entirety by reference numeral 58. This bridge rectifier network 58 is depicted in the schematic circuit diagram of FIGURE 8, and it is seen that it connects the rotatable three-phase winding 40 of the exciter generator with the rotatable field winding 54 of the main generator. In its physical form, the bridge rectifier 58 comprises three silicon diodes 60 which are mounted on an annular metal heat sink 62. The other three diodes 64 are mounted on a second annular metal heat sink 66. Only one of the diodes 60 is illustrated in FIGURE 1, but it is to be understood that there will be two other diodes of this type which have studs that are threaded into threaded openings in the heat sink 62. In a like manner, there are three other diodes 64 which are threaded into threaded openings in the metal heat sink 66. The metal heat sink 62 is indicated schematically in FIGURE 8 by a lead wire line as is the metal heat sink 66.

It will be appreciated by those skilled in the art that the studs of diodes 60 must have an opposite polarity as compared to the studs of diodes 64. In other words, the anodes of the diodes 60 will be connected to their studs whereas the cathodes of diodes 64 will be connected with their studs. The projecting terminals of the diodes 60 and 64 are connected together and with the phase windings of three phase winding 40 as is clearly apparent from FIGURE 8. The output terminals for the bridge rectifier 58 which in effect are the two heat sinks 62 and 66, are connected to the rotatable field 54. It can be seen from FIGURE 1, that both heat sinks 62 and 66 are insulated from the sleeve 44 by the insulator 68 and that the heat sinks are insulated from each other by the insulator 70.

The A.C. output of the three-phase output winding 50 is rectified to direct current by a three-phase full wave bridge rectifier network 72. This bridge rectifier network 72 in its physical form includes semiconductor diodes 74 which have an outer case that is threaded. These diodes 74 are mounted respectively in heat sinks 76 which are supported from the frame 12 by terminal studs 78. Each diode 74 is threaded into a threaded opening in a respective heat sink block 76 as is better illustrated in FIGURE 1. There are three terminal studs 78 connected respectively with the phase windings of the stator winding 50 so that each heat sink block 76 has the same potential as the end of a respective phase winding. It can be seen from FIGURE 1 that the terminal studs 78 are insulated from the frame 12 and that the heat sinks 76 are likewise insulated from the frame 12. The diodes 74 are illustrated schematically in FIGURE 8 with the lead wires 76 indicating the heat sink blocks.

The projecting terminals of diodes 74 are connected together at a junction 80 which takes the form of a bolt connected with the strap connector 82. The strap connector 82 is connected with one or more terminals 84 which form one of the D.C. output terminals for the machine.

The other three diodes 86 which make up the three phase full wave bridge rectifier network 72, like the diodes 74, are of the semiconductor type and preferably of the silicon type. These diodes like the diodes 74 have outer metal cases which are connected with one side of the rectifying junction and have terminals insulated from the metal case which are connected with the other side of the rectifying junction. It can be seen from FIGURE 2 that the diodes 86 are threaded into threaded openings formed in the end section 12a of the frame 12. These diodes have external threads which are complementary to the internal threads formed in the openings in the end section 12a of the frame 12. The terminals 86a of the diodes 86 are connected respectively with the heat sink blocks 76 and thus are connected respectively with the phase windings of the output winding 50. The end section 12a of the frame 12 forms a common connection for the case side of the diodes 86 and this is illustrated in the schematic diagram of FIGURE 8. The frame 12 thus forms one of the D.C. output terminals for the bridge rectifier network 72 and in the schematic circuit diagram of FIGURE 8, this D.C. output terminal is grounded.

It will be apparent from the foregoing that the heat sinks 76 connect the cathodes of diodes 86 respectively with the anodes of diodes 74. These heat sinks are also respectively connected with the phase windings of output winding 50. The D.C. output is taken off the bridge rectifier 72 from terminal 84 and the frame 12 which can be connected with a terminal if desired. The diodes 74 and 86 may be identical with the outer metal case of each group of diodes being of the same polarity since the heat sinks 76 connect the metal cases of diodes 74 with the terminals of diodes 86.

The diodes 74 and 86 are enclosed by a part of the frame 12 and by a cover plate 90 which is attached to the frame 12. A suitable O-ring seal is disposed between the cover 90 and the frame 12 to form a liquid-tight compartment 92. In this connection, the terminal 84 has a liquid-tight connection with the frame 12.

The dynamoelectric machine of this invention is entirely oil cooled and the cooling circuit for the machine will now be described. The oil inlet passage for the machine is designated by reference numeral 94. This passage feeds a small compartment 96 and this compartment is connected with the compartment 92 by passages 98 and 100. The oil that is forced into the chamber 92 can enter the chamber 22 through small passages 102 and 104. These passages are formed in the end section 12a of the frame 12 and these passages will supply some cooling oil to the compartment 22 on the area to the left of the rotor 56 as viewed in FIGURE 1.

The compartment 92 is connected with vertical passages 106 and 108 which are formed in the frame 12. The vertical passages 106 and 108 are connected with longitudinally extending passages 110 and 112 which are formed in the housing 10. These passages extend from left to right in FIGURE 1 but are not illustrated in this figure.

The longitudinally extending passage 110 feeds a spray nozzle 114 which is depicted in section in FIGURE 6. This spray nozzle 114 has a plurality of openings 116 at its lower end which are adapted to spray oil on the rotating diodes 60 and 64 and the heat sinks 62 and 66.

The longitudinally extending passage 112 feeds another spray nozzle 118 which is identical with the nozzle 114. The nozzle 118 is shown in FIGURE 1 and it is seen that it is in such a position as to spray oil on the rotating rectifier assembly. Because of the disposition of the passages 116, some of this oil may also be sprayed on the three-phase winding 40 which forms a part of the rotor 32.

Referring now more particularly to FIGURE 5, it is seen that the longitudinally extending passage 110 communicates with a transverse passage 124 which is also shown in FIGURE 1. The passage 124 is connected with a longitudinally extending passage 126 which is located parallel to the passages 110 and 112. The passage 126 feeds a spray nozzle 128 having openings at its lower end which face the windings 40 and 46. The spray nozzle 128 will thus spray oil on the windings 40 and 46 of the exciter generator.

The outlet passage for cooling oil is designated by reference numeral 130 and is formed in the housing 10. This outlet pasage 130 is connected with a heat exchanger 132 in a manner depicted in the schematic diagram of FIGURE 7.

Referring now to FIGURE 8, it is seen that the terminal 84 is connected to one side of a battery 134 which thus is charged from the output of the bridge rectifier 72. This bridge rectifier, of course, will supply other electrical loads which are not illustrated. The field winding 46 of exciter generator 32 is connected with junction 84 through a suitable voltage regulator 136. It thus is seen that the field current for the field winding 46 is supplied from the D.C. output of the bridge rectifier 72. In some cases, the regulator 136 may be of the type shown in co-pending applications, Serial No. 223,747, filed on September 14, 1962, or Serial No. 223,746, filed on September 14, 1962, with suitable connections, both of said applications being assigned to the assignee of this application.

Referring now more particularly to FIGURE 7, the complete oil cooling circuit for the dynamoelectric machine will now be traced. The oil which leaves the dynamoelectric machine at oil outlet opening 130 is fed to the heat exchanger 132 and the outlet of the heat exchanger is connected to the inlet of an oil pump 140. The outlet of the oil pump 140 forces oil into the compartment 92 where it is effective to cool the diodes 74 and 86. The oil directly contacts certain parts of the diodes and will also contact the heat sinks 76 and of course will contact the wall 12a which carries the diodes 86.

The oil leaves chamber 92 via the passages 102 and 104 which feed the chamber 22. The oil in chamber 22 will cool the windings on the main and exciter generators and this oil is circulated to some extent by rotation of the rotor 34. The oil supplied to the nozzles 114 and 118 cools the rotating diodes 60 and 64 and to some extent cools the winding 40. The oil supplied to nozzle 128 is directed against winding 40 and 46 to cool these windings. The oil is continuously circulated in the system of FIGURE 7 so that maximum current may be carried by the various parts of the dynamoelectric machine due to the oil cooling. The oil also will lubricate the bearings 18 and 20 as will be apparent to those skilled in the art.

To summarize the electrical operation of this dynamoelectric machine, it will be appreciated that three phase A.C. voltage is developed in the output winding 40 of the exciter generator 32 whenever the field winding 46 is supplied with direct current and rotor 32 is rotating. The A.C. output of the winding 40 is rectified by the rotating bridge rectifier 58 and this bridge rectifier supplies direct current to the rotating field winding 50 which is rectified to direct current by the bridge rectifier network 72. The output terminals of the bridge rectifier network 72 will then supply any direct current loads on a motor vehicle such as a tank which require high output current. In this connection, the dynamoelectric machine of this invention may have a rating of 500 amperes at 28 volts.

It will be appreciated from the foregoing that a high output dynamoelectric machine has been provided which in one package provides a D.C. output without the use of brushes. It will also be appreciated that the current carrying elements of this dynamoelectric machine are completely oil cooled so that the various current carrying elements may carry maximum current. In addition, the entire dynamoelectric machine is enclosed so that the parts of the machine cannot be subjected to external substances that might be harmful to the internal parts of the machine.

While the embodiments of the present invention as herein disclosed, constitute a preferred form, it is to be understood that other forms might be adopted.

What is claimed is as follows:

1. A dynamoelectric machine comprising, housing means defining first and second chambers, an exciter generator and a main generator located in said first chamber, a shaft rotatable in said first chamber supporting an output winding for said exciter generator and a field winding for said main generator, a plurality of first semi-conductor diodes electrically connecting the output winding of said exciter generator with the field winding of said main generator, a plurality of second semiconductor diodes located in said second chamber, means electrically connecting the output winding of said main generator with said second diodes, an inlet for cooling a medium for said dynamoelectric machine communicating with said second chamber, first and second nozzle means located in said first chamber for directing a flow of cooling medium respectively against said first diodes and against the windings of said exciter generator, and passage means connecting said second chamber with said nozzle means.

2. A dynamoelectric machine comprising, housing means, a wall dividing said housing means into first and second chambers, main and exciter generators located within said first chamber, a shaft rotatable in said first chamber carrying the output winding of the exciter generator and the field winding of the main generator, a first group of diodes rotatable with said shaft connecting the output winding of the exciter generator with the field winding of the main generator, a second group of diodes located in said second chamber, means electrically connecting the output winding of said main generator with said second group of diodes, an inlet for a cooling medium communicating with said second chamber, passage means in said wall connecting said first chamber with said second chamber, first and second nozzle means disposed within said first chamber for spraying a cooling medium on said first group of diodes and on the windings of said exciter generator, passage means formed in said housing means connecting said second chamber with said nozzle means, and an outlet for cooling medium communicating with said first chamber.

3. A dynamoelectric machine comprising, housing means, a wall dividing said housing means into first and second chambers, an exciter generator and a main generator disposed within said first chamber, shaft means rotatable in said first chamber carrying the output winding of the exciter generator and the field winding of said main generator, first diode means rotatable with said shaft electrically connecting the output winding of said exciter generator with the field winding of said main generator, first and second nozzle means supported by said housing means having outlets located respectively in alignment with said diode means and with the windings of said exciter generator, second diode means located in said second chamber, means electrically connecting the output winding of said main generator with said second diode means, and liquid circulating means for said dynamoelectric machine having an outlet connected with said second chamber, restricted openings in said wall permitting a flow of liquid from said second chamber to said first chamber, passage means in said housing means connecting said second chamber with said first and second nozzle means, and a liquid outlet communicating with said first chamber and connected with the inlet side of said liquid circulating means.

4. A dynamoelectric machine comprising, housing means, an exciter generator and a main generator disposed within said housing means, a shaft rotatable with respect to said housing means, said shaft carrying the output winding of said exciter generator and the field winding of said main generator, first diode means carried by said shaft and rotatable therewith electrically connecting the output winding of said exciter generator and the field winding of said main generator, second diode means supported by said housing means electrically connected with the output winding of said main generator, an inlet passage for said dynamoelectric machine, an outlet passage for said dynamoelectric machine, a cooling path connecting said inlet and outlet passages operative to direct a liquid cooling medium against said first and second diodes and against the windings of said exciter generator and main generator, and means connected with said inlet and outlet for circulating a liquid cooling medium through said dynamoelectric machine.

References Cited by the Examiner

UNITED STATES PATENTS

| | | | |
|---|---|---|---|
| 2,722,652 | 11/1955 | Brainard | 310—113 |
| 2,862,119 | 11/1958 | Else et al. | 310—54 |
| 2,897,383 | 7/1959 | Barrows et al. | 310—68 |
| 3,010,040 | 11/1961 | Braun | 310—112 |

ORIS L. RADER, *Primary Examiner.*

MILTON O. HIRSHFIELD, *Examiner.*